(12) United States Patent
Chu et al.

(10) Patent No.: US 8,732,799 B2
(45) Date of Patent: May 20, 2014

(54) METHOD AND SYSTEM FOR PROCESSING AUTHENTICATOR RELOCATION REQUEST

(75) Inventors: Li Chu, Shenzhen (CN); Jianquan Song, Shenzhen (CN); Hongyun Qu, Shenzhen (CN); Ling Xu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 120 days.

(21) Appl. No.: 13/634,550

(22) PCT Filed: Mar. 16, 2011

(86) PCT No.: PCT/CN2011/071880
§ 371 (c)(1),
(2), (4) Date: Sep. 13, 2012

(87) PCT Pub. No.: WO2011/113359
PCT Pub. Date: Sep. 22, 2011

(65) Prior Publication Data
US 2013/0014220 A1 Jan. 10, 2013

(30) Foreign Application Priority Data
Mar. 17, 2010 (CN) .......................... 2010 1 0139679

(51) Int. Cl.
G06F 7/04 (2006.01)
G06F 3/12 (2006.01)
(52) U.S. Cl.
CPC .................................... *G06F 3/1226* (2013.01)
USPC .......................................................... 726/3
(58) Field of Classification Search
CPC ................................................... G06F 3/1226
USPC .......................................................... 726/3
See application file for complete search history.

(56) References Cited

U.S. PATENT DOCUMENTS 7,561,692 B2 * 7/2009 Altshuller et al. ............. 380/247
2010/0232606 A1 * 9/2010 Lee et al. ...................... 380/270

FOREIGN PATENT DOCUMENTS

| CN | 101039312 A | 9/2007 |
| CN | 101127659 A | 2/2008 |
| CN | 101166363 A | 4/2008 |
| JP | 2005109823 A | 4/2005 |
| JP | 2008141362 A | 6/2008 |
| JP | 2009533932 A | 9/2009 |

(Continued)

OTHER PUBLICATIONS

International Search Report in international application No. PCT/CN2011/071880, mailed on Jun. 23, 2011.

(Continued)

*Primary Examiner* — Jacob Lipman
(74) *Attorney, Agent, or Firm* — Oppedahl Patent Law Firm LLC

(57) ABSTRACT

The disclosure provides a method and a system for processing an authenticator relocation request. When detecting that initial authentication, re-authentication or authenticator relocation is being performed for a terminal, a network side refuses a new authenticator relocation request from the terminal. When detecting that no initial authentication, re-authentication or authenticator relocation is being performed for the terminal, the network side accepts the new authenticator relocation request from the terminal. Further, when detecting that the initial authentication, the re-authentication or the authenticator relocation is being performed for the terminal, the network side refuses a new re-authentication request from the terminal. According to the technical solution of the disclosure, the complexity of network element processing is reduced and potential safety hazard is avoided.

20 Claims, 4 Drawing Sheets

(56) References Cited

FOREIGN PATENT DOCUMENTS

| | | |
|---|---|---|
| JP | 2010503258 A | 1/2010 |
| JP | 2011504695 A | 2/2011 |
| WO | 2009076822 A1 | 6/2009 |

OTHER PUBLICATIONS

English Translation of the Written Opinion of the International Search Authority in international application No. PCT/CN2011/071880, mailed on Jun. 23, 2011.

* cited by examiner

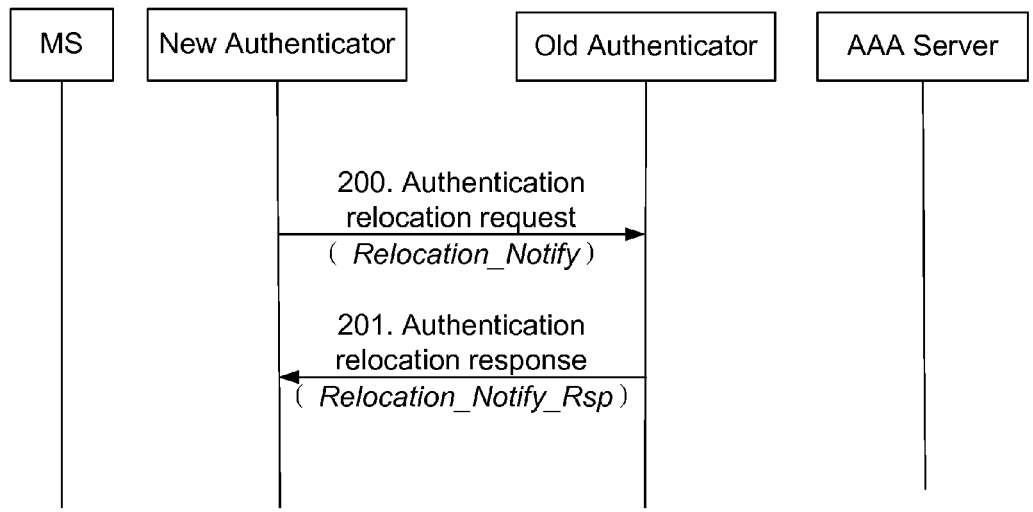
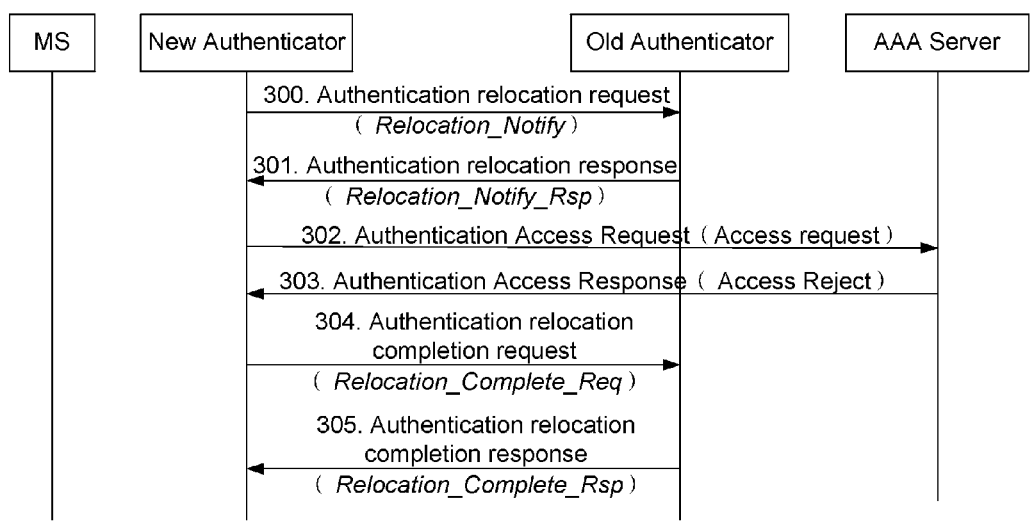

METHOD AND SYSTEM FOR PROCESSING AUTHENTICATOR RELOCATION REQUEST

TECHNICAL FIELD

The disclosure relates to a broadband wireless communication network technology, and more particularly to a method and a system for processing an authenticator relocation request.

BACKGROUND

Taking Worldwide Interoperability for Microwave Access (WiMAX) for example, as a new 4G standard, the WiMAX has attracted much attention of telecommunications operators and equipment manufacturers all over the world and predominated in the wireless broadband field. FIG. 1 shows a diagram illustrating a composition architecture of an existing WiMAX network. As shown in FIG. 1, the WiMAX network mainly consists of a Mobile Terminal (MT), a Base Station (BS), an Access Gateway (AGW, not shown in FIG. 1), an authenticator and an Authentication Authorization Accounting (AAA) server and other network elements, wherein the AGW, the BS and the authenticator are located in an Access Service Network (ASN) and the AAA server is located in a Connection Service Network (CSN).

When an MS accesses a network initially, the network assigns an authenticator in the ASN to perform authentication, together with a Home AAA (HAAA) server, on the MS. Before the life cycle of some security parameters or a timer expires, the MS or a network side may initiate re-authentication, which may be accompanied by authenticator relocation, and accordingly, a new authenticator becomes an anchor authenticator of the MS.

Existing relocation of an anchor authenticator may be accompanied by re-authentication in some scenarios while the re-authentication may not occur in other scenarios, wherein in the anchor authentication relocation accompanied by the re-authentication, an old authenticator performs the re-authentication together with an HAAA sever on a new authenticator after confirming the new authenticator. After the re-authentication is ended, the new authenticator notifies the old authenticator that the authenticator relocation has been completed.

The existing anchor authenticator relocation accompanied by re-authentication has the following problems: a plurality of authenticator relocation processes may be initiated/occur at the same time for the same MS session; or a new authenticator relocation request may be initiated when a re-authentication process has not been completed; or a new re-authentication request may be initiated when authenticator relocation has not been completed. In such cases, not only the complexity of network element processing is increased, but also the potential safety hazard may be caused because a network element needs to deal with a plurality of processes and maintain multiple sets of contexts/information at the same time.

Currently, existing technologies are designed just for a re-authentication process; a new re-authentication request is refused through a re-authentication locked state on an anchor authenticator of an MS, in this way, when the re-authentication locked state is in a locked state and re-authentication of the MS is being performed, a network will refuse the new re-authentication request. However, according to the existing technologies, if there is a new authenticator relocation request, the network will not refuse it, thus the new authenticator relocation request is accepted in a process in which the re-authentication occurs. Or according to the existing technologies, when the MS is performing authenticator relocation and if there is a new authenticator relocation request, the network will not refuse the new authenticator relocation request, thus the new authenticator relocation request is accepted in a process in which the re-authentication occurs. Or according to the existing technologies, when the MS is performing authenticator relocation, and if there is a new re-authentication request, the network will not refuse the new re-authentication request, thus the new re-authentication request is accepted in a process in which the authenticator relocation occurs.

The problem also exists in other communication systems. In an LTE system for example, when relocation occurs but has not been completed in a Mobility Management Entity (MME) or a Serving Gateway (S-GW) corresponding to User Equipment (UE), the system should also avoid recurrence of the relocation on the MME or the S-GW of the same UE. As shown in FIG. 2, UE accesses a network via an Evolved Node B (eNB) in an LTE system, an MME is in charge of a UE-related control plane, and an S-GW is in charge of a UE-related user plane. Corresponding functions of an authenticator are realized on the MME.

Existing methods of processing an authenticator relocation request not only increase the complexity of network element processing, but also brings about potential safety hazard because a network element needs to deal with a plurality of processes and maintain multiple sets of contexts/information at the same time.

SUMMARY

In view of this, the main purpose of the disclosure is to provide a method and a system for processing an authenticator relocation request, thus reducing the complexity of network element processing and avoiding potential safety hazard.

To achieve the purpose above, the technical solution of the disclosure is implemented by the following method.

A method for processing an authenticator relocation request includes:

refusing, by a network side, a new authenticator relocation request from a terminal, when the network side detects that initial authentication, re-authentication or authenticator relocation is being performed for the terminal.

The method may further include: refusing, by the network side, a new re-authentication request from the terminal, when the network side detects that the initial authentication, the re-authentication or the authenticator relocation is being performed for the terminal.

The network side may be an anchor authenticator. The new authenticator relocation request may be from the terminal and forwarded by a serving BS, or from the serving BS itself, or from a new authenticator.

The new re-authentication request may be from the terminal and forwarded by a serving BS, or from the serving BS itself, or from a new authenticator.

The network side may be an AAA server.

The network side may be an MME.

The new authenticator relocation request may be from the terminal and forwarded by an ASN, or from a serving BS itself, or from an old authenticator, or from a new authenticator.

The new re-authentication request may be from the terminal and forwarded by an ASN, or from a serving BS itself, or from an old authenticator, or from a new authenticator.

The method may further include: confirming, by the network side, that no initial authentication, re-authentication or authenticator relocation is being performed for the terminal, when the initial authentication, the re-authentication or the authenticator relocation of the terminal is completed.

Detecting by the network side whether or not the initial authentication, the re-authentication or the authenticator relocation is being performed may include:

setting an authenticator relocation state identifier for the terminal at the network side; when the authenticator relocation state identifier shows a locked state, indicating that the initial authentication, the re-authentication or the authenticator relocation is being performed for the terminal;

or, setting a counter for the terminal at the network side; an initial value of the counter being 0; when the network side receives an initial authentication request, a re-authentication request, or an authenticator relocation request from the terminal, adding 1 to the initial value at the counter; when the initial authentication, the re-authentication or the authenticator relocation for the terminal is completed, adding 1 to the initial value at the counter; when a value of the counter is an odd number, indicating that the initial authentication, the re-authentication or the authenticator relocation is being performed for the terminal; when a value of the counter is an even number, indicating that no re-authentication or authenticator relocation is being performed;

or, when the network side receives an initial authentication request, a re-authentication request, or an authenticator relocation request from the terminal, setting and starting a timer for the terminal at the network side; when the timer does not expire, indicating that the initial authentication, the re-authentication or the authenticator relocation is being performed for the terminal.

The network side may include an anchor authenticator, an AAA server or an MME.

A system for processing an authenticator relocation request at least includes a requesting entity and a detecting entity at a network side, wherein the requesting entity is configured to initiate an authenticator relocation request from a terminal to the detecting entity; and the detecting entity is configured to receive the authenticator relocation request and refuse a new authenticator relocation request from the terminal when detecting that initial authentication, re-authentication or authenticator relocation is being performed for the terminal.

The detecting entity may be further configured to, when detecting that the initial authentication, the re-authentication or the authenticator relocation is being performed for the terminal, refuse a new re-authentication request from the terminal.

The detecting entity may be further configured to, when the initial authentication, the re-authentication or the authenticator relocation of the terminal is completed, confirm that no initial authentication, re-authentication or authenticator relocation is being performed for the terminal.

The detecting entity may be an old authenticator. The new authenticator relocation request may be from the terminal and forwarded by a serving BS, or from the serving BS itself, or from the old authenticator, or from a new authenticator;

The new re-authentication request may be from the terminal and forwarded by a serving BS, or from the serving BS itself, or from the old authenticator, or from a new authenticator.

The detecting entity may be an AAA server. The new authenticator relocation request may be from the terminal and forwarded by an ASN, or from a serving BS itself, or from an old authenticator, or from a new authenticator;

the new re-authentication request may be from the terminal and forwarded by a serving BS, or from the serving BS itself, or from an old authenticator, or from a new authenticator.

The requesting entity may be a new authenticator; the detecting entity may be an old authenticator; the system may further include an AAA server; wherein the new authenticator may be configured to initiate the authenticator relocation request from the terminal to the old authenticator, receive a response from the old authenticator; send an authenticator access verification request to the AAA server when the response received from the old authenticator is a success response; send an authenticator relocation completion request including refusal information to the old authenticator when receiving a refusal response from the AAA server; and send an authenticator relocation completion request including success information to the old authenticator when receiving a success response from the AAA server;

the old authenticator may be configured to receive the authenticator relocation request from the terminal, refuse an authenticator access request from the new authenticator when detecting that the initial authentication, the re-authentication or the authenticator relocation is being performed for the terminal; confirm that initial authentication, re-authentication or authenticator relocation is to be performed for the terminal when detecting that no initial authentication, re-authentication or authenticator relocation is being performed for the terminal; and when receiving the authenticator relocation completion request from the new authenticator, confirm that the authenticator relocation is completed and that no initial authentication, re-authentication or authenticator relocation is being performed for the terminal; and the AAA server may be configured to receive the authenticator access verification request from the new authenticator, return the success response after verification is completed successfully; and return the refusal response when the verification is failed.

The requesting entity may be a new authenticator; the detecting entity may be an AAA server; the system may further include an old authenticator; wherein the new authenticator may be configured to initiate the authenticator relocation request from the terminal to the old authenticator, receive a response from the old authenticator, and send an authenticator access request to the AAA server; send an authenticator relocation completion request including refusal information to the old authenticator when receiving a refusal response from the AAA server; and send an authenticator relocation completion request including success information to the old authenticator when receiving a success response from the AAA server;

the old authenticator may be configured to receive the authenticator relocation request, and return the response; and receive the authenticator relocation completion request including refusal information and return an authenticator relocation completion response; and the AAA server may be configured to receive the authenticator access request, refuse the authenticator access request from the new authenticator when detecting that the initial authentication, the re-authentication or the authenticator relocation is being performed for the terminal; or confirm that initial authentication, re-authentication or authenticator relocation is to be performed for the terminal when detecting that no initial authentication, re-authentication or authenticator relocation is being performed for the terminal; or approve the authenticator access request and confirm that corresponding initial authentication, re-authentication or authenticator relocation has been completed for the terminal.

The requesting entity may be an old authenticator; the detecting entity may be an AAA server; the system may further include a new authenticator; wherein the old authenticator may be configured to send the new authenticator relocation request to the new authenticator and continues to serve as an authenticator of the terminal when a received authenticator relocation response includes refusal information;

the new authenticator may be configured to receive the authenticator relocation request, send an authenticator access request to the AAA server; after receiving a refusal response from the AAA server, send the authenticator relocation response including refusal information to the old authenticator; and receive a success response from the AAA server, and send an authenticator relocation completion request including success information to the old authenticator; and the AAA server may be configured to receive the authenticator access request, refuse the authenticator access request from the new authenticator when detecting that the initial authentication, the re-authentication or the authenticator relocation is being performed for the terminal; or when detecting that no initial authentication, re-authentication or authenticator relocation is being performed for the terminal, confirm that initial authentication, re-authentication or authenticator relocation is to be performed for the terminal; or approve the authenticator access request and confirm that corresponding initial authentication, re-authentication or authenticator relocation has been completed for the terminal.

It can be seen from the above technical solution provided by the disclosure that, when detecting that initial authentication, re-authentication or authenticator relocation is being performed for a terminal, a network side refuses a new authenticator relocation request from the terminal. When detecting that no initial authentication, re-authentication or authenticator relocation is being performed for the terminal, the network side accepts the new authenticator relocation request from the terminal. Further, when detecting that the initial authentication, the re-authentication or the authenticator relocation is being performed for the terminal, the network side refuses a new re-authentication request from the terminal. Using the technical solution provided by the disclosure, the complexity of network element processing is reduced and potential safety hazard is avoided.

BRIEF DESCRIPTION OF THE DRAWINGS

FIG. 3 is a flowchart of processing an authenticator relocation request according to the first embodiment of the disclosure;

FIG. 4 is a flowchart of processing an authenticator relocation request according to the second embodiment of the disclosure;

DETAILED DESCRIPTION

Figure 1:
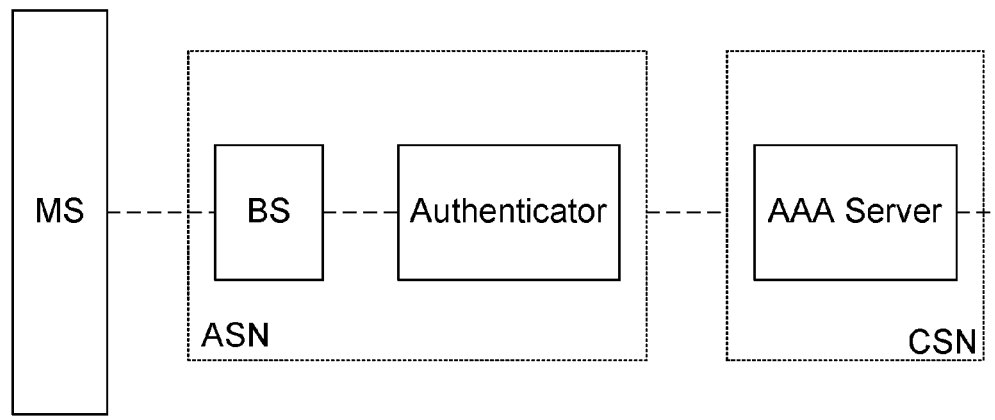
FIG. 1 is a diagram illustrating a composition architecture of an existing WiMAX network.
Figure 2:
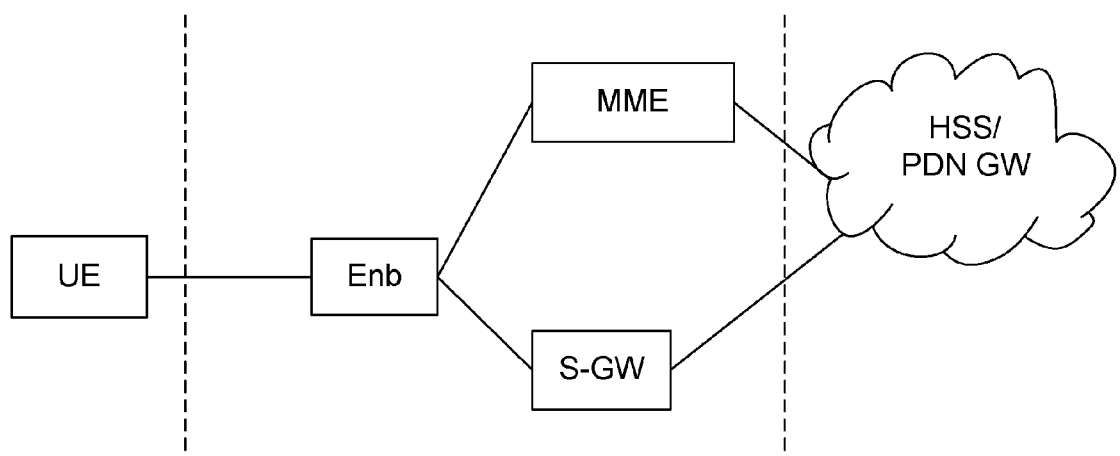
FIG. 2 is a diagram illustrating a composition architecture of an existing LTE system.

A method for processing an authenticator relocation request in the disclosure includes: when detecting that initial authentication, re-authentication or authenticator relocation is being performed for a terminal, a network side refuses a new authenticator relocation request from the terminal; when detecting that no initial authentication, re-authentication or authenticator relocation is being performed for the terminal, the network side accepts the new authenticator relocation request from the terminal. Further, when detecting that the initial authentication, the re-authentication or the authenticator relocation is being performed for the terminal, the network side refuses a new re-authentication request from the terminal, wherein a specific implementation method for the network side to detect whether or not the initial authentication, the re-authentication or the authenticator relocation is being performed may include:

an authenticator relocation state identifier is set for the terminal at the network side. When the authenticator relocation state identifier shows a locked state, it indicates that the initial authentication, the re-authentication or the authenticator relocation is being performed for the terminal, and other subsequent new authenticator relocation requests will not be accepted until the authenticator relocation locked state is released.

Or a counter is set for the terminal at the network side. An initial value of the counter is 0. When the network side receives an initial authentication request, a re-authentication request, or an authenticator relocation request from the terminal, the counter adds 1 to the initial value, i.e. the current value is 1. When the initial authentication, the re-authentication or the authenticator relocation of the terminal is completed, the counter adds 1 to the initial value, i.e. the current value is 2, and the initial value is increased gradually in this way. The counter adds 2 to the initial value each time when the initial authentication, re-authentication or authenticator relocation is completed for the terminal. The initial value is reset to 0 when a maximum value is reached. By doing so, when a value of the counter is an odd number, it indicates that the initial authentication, the re-authentication or the authenticator relocation is being performed for the terminal, and other subsequent new authenticator relocation requests will not be accepted. When a value of the counter is an even number, no re-authentication or authenticator relocation is being performed;

or when an initial authentication request, a re-authentication request or an authenticator relocation request from the terminal is received at the network side, a timer is set and started for the terminal at the network side. The timer does not stop until the initial authentication, the re-authentication or the authenticator relocation is completed for the terminal. when the timer expires but the initial authentication, the re-authentication or the authenticator relocation has not been completed for the terminal, the network side stops the initial authentication, the re-authentication or the authenticator relocation of the terminal and the initial authentication, the re-authentication or the authenticator relocation of the terminal is regarded as failed. In other words, when the timer does not expire, other subsequent new authenticator relocation requests are not accepted any longer, and this situation continues until the timer expires or stops.

The network side may be an anchor authenticator, or an AAA server. The AAA server in the disclosure is an HAAA server of the terminal.

Further, the method of the disclosure includes: when detecting that the initial authentication, the re-authentication or the authenticator relocation is being performed for the terminal, the network side refuses a new re-authentication request from the terminal.

Further, the method of the disclosure includes: when a new relocation request arrives and the network side detects that no initial authentication, re-authentication or authenticator relocation is being performed for the terminal, the network side confirms that initial authentication, re-authentication or authenticator relocation is to be performed for the terminal. At the moment, the authenticator relocation state identifier is set to a locked state, the counter is set to an odd number, or the timer is started, and the network side on longer accepts a subsequent new authenticator relocation request or re-authentication request from the terminal. When the initial authentication, the re-authentication or the authenticator relocation is completed, it is regarded that no initial authentication, re-authentication or authenticator relocation is being performed for the terminal no matter the result of the initial authentication, the re-authentication or the authenticator relocation is successful or failed; at this moment, the authenticator relocation state identifier is set to an unlocked state, or the counter is set to an even number, or the timer is stopped, and the network side will accept a subsequent new authenticator relocation request or re-authentication request from the terminal.

For the anchor authenticator, i.e. an old authenticator, the new authenticator relocation request may be from the terminal and forward by a serving BS, or from the serving BS itself, or from a new authenticator. The new re-authentication request may be from the terminal and forward by a serving BS, or from the serving BS itself. Further, when detecting that initial authentication, re-authentication or authenticator relocation is being performed for the terminal, the anchor authenticator will not initiate a new authenticator relocation request or re-authentication request initiatively.

For the AAA server, the new authenticator relocation request may be from the terminal and forward by an ASN, or from a serving BS itself, or from an old authenticator, or from a new authenticator. The new re-authentication request may be from the terminal and forward by an ASN, or from a serving BS itself, or from a new authenticator.

FIG. 3 is a flowchart of the first embodiment in which a new authenticator relocation request is from a new authenticator and whether or not to accept the new authenticator relocation request is determined by an anchor authenticator during processing of an authenticator relocation request in the disclosure. As shown in FIG. 3, the following steps are included:

Step 200: a new authenticator sends a new authenticator relocation request to an old authenticator; and Step 201: the old authenticator returns an authenticator relocation response to the new authenticator;

in this step, the authenticator relocation response includes refusal or acceptance information, e.g. an authenticator relocation state identifier shows an authenticator relocation locked state or an authenticator relocation unlocked state; or a counter is set to an odd number or an even number; or a timer has not expired or has expired.

FIG. 4 is a flowchart of the second embodiment in which a new authenticator relocation request is from a new authenticator and whether or not to accept the new authenticator relocation request is determined by an AAA server during processing of an authenticator relocation request in the disclosure. As shown in FIG. 4, the following steps are included:

Step 300: a new authenticator sends a new authenticator relocation request to an old authenticator;

Step 301: the old authenticator returns an authenticator relocation response to the new authenticator;

Step 302: the new authenticator sends an authenticator access request to an AAA server;

Step 303: the AAA server returns an authenticator access response to the new authenticator; in this step, the authenticator access response includes refusal or acceptance information, e.g. an authenticator relocation state identifier shows an authenticator relocation locked state or an authenticator relocation unlocked state; or a counter is set to an odd number or an even number; or a timer has not expired or has expired;

Step 304: the new authenticator sends an authenticator relocation completion request to the old authenticator, wherein the authenticator relocation completion request includes refusal or acceptance information; and Step 305: the old authenticator returns an authenticator relocation completion response to the new authenticator;

In this step, if the received authenticator relocation completion request includes acceptance information, the old authenticator may return a terminal context to the new authenticator; If the received authenticator relocation completion request includes refusal information, then the authenticator relocation completion response returned by the old authenticator indicates a failure and the current flow is ended.

Figure 5:
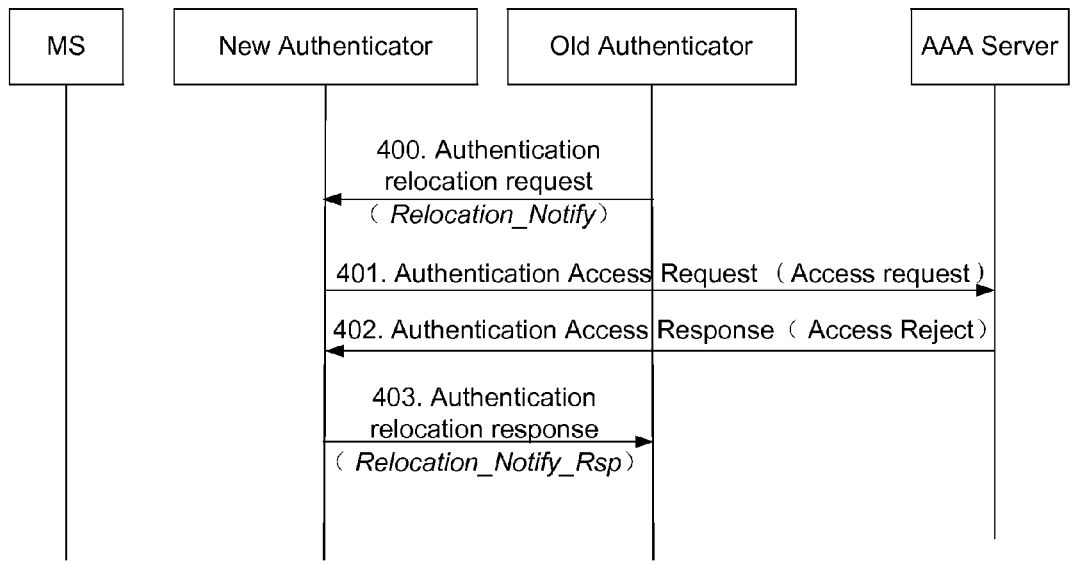
FIG. 5 is a flowchart of processing an authenticator relocation request according to the third embodiment of the disclosure.

FIG. 5 is a flowchart of the third embodiment in which a new authenticator relocation request is from an old authenticator and whether or not to accept the new authenticator relocation request is determined by an AAA server during processing of an authenticator relocation request in the disclosure. As shown in FIG. 5, the following steps are included:

Step 400: an old authenticator sends a new authenticator relocation request to a new authenticator;

Step 401: the new authenticator sends an authenticator access request to an AAA server;

Step 402: the AAA server returns an authenticator access response to the new authenticator; in this step, the authenticator access response includes refusal or acceptance information, e.g. an authenticator relocation state identifier shows an authenticator relocation locked state or an authenticator relocation unlocked state; or a counter is set to an odd number or an even number; or a timer has not expired or has expired.

Step 403: the new authenticator returns an authenticator relocation response to the old authenticator and the authenticator relocation response includes refusal or acceptance information.

If the received authenticator relocation response includes acceptance information, then the old authenticator returns a terminal context to the new authenticator. If the received authenticator relocation response includes refusal information, then the old authenticator continues to serve as an authenticator of the terminal.

Figure 6:
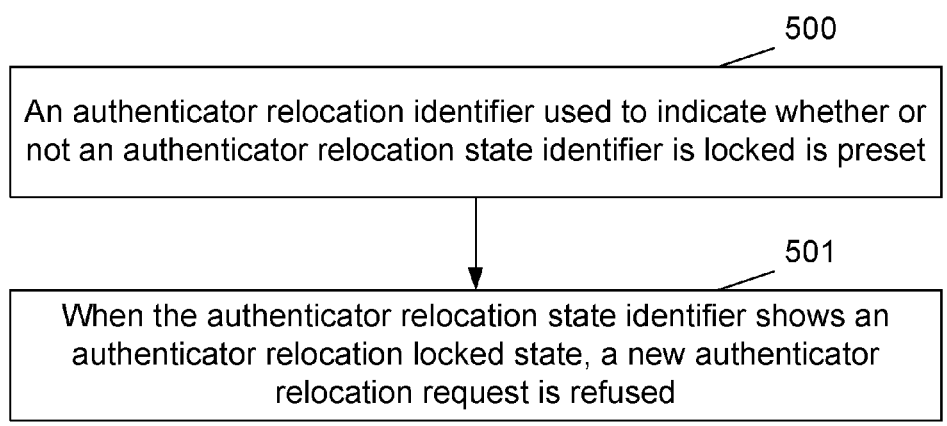
FIG. 6 is a flowchart of processing an authenticator relocation request by adopting an authenticator relocation state identifier according to an embodiment of the disclosure.

FIG. 6 is a flowchart of processing an authenticator relocation request by adopting an authenticator relocation state identifier according to an embodiment of the disclosure. As shown in FIG. 6, the following steps are included:

Step 500: an authenticator relocation identifier used to indicate whether or not an authenticator relocation state identifier is locked is preset;

when initial authentication, re-authentication or authenticator relocation is being performed for a terminal, the authenticator relocation state identifier is set to an authenticator relocation locked state; and Step 501: when the authenticator relocation state identifier shows the authenticator relocation locked state, a new authenticator relocation request is refused;

in an LTE system, a relocation state is maintained on an MME when relocation is performed for the MME during processing of an authenticator relocation request in the disclosure, in other words:

when the current MME receives a new relocation request, the relocation request may be from a terminal and forwarded by a BS, or from the BS, or from a new MME.

When perceiving that the terminal is in a relocation locked state, the current MME refuses the relocation request; further, a failure reason may be set as relocation state locked.

When perceiving that the terminal is in the relocation locked state, the current MME will not initiate relocation initiatively.

The authenticator relocation request in the disclosure may be accompanied by re-authentication, or may not be accompanied by re-authentication.

In this step, the determination on the new authenticator relocation request may be implemented under the control of an anchor authenticator, or may be implemented at an AAA server. In other words, the authenticator relocation state identifier may be maintained by the anchor authenticator or the AAA server. If the authenticator relocation state identifier is maintained on the anchor authenticator of the terminal, then the old anchor authenticator stops maintaining the authenticator relocation state identifier after successful completion of the authenticator relocation, and a new anchor authenticator sets the authenticator relocation state identifier to an unlocked state for a session of the terminal.

Further, the method of the disclosure further includes: when refusing an authenticator relocation request, a response to the request is returned and a response message includes a failure indication for indicating that the failure reason is that an authenticator relocation state identifier state is an authenticator relocation locked state.

Further, the method of the disclosure further includes: when initial authentication, re-authentication or authenticator relocation is completed, no matter the result of the initial authentication, the re-authentication or the authenticator relocation is successful or failed, the authenticator relocation state identifier state is changed into an authenticator relocation unlocked state, i.e. a new authenticator relocation request is allowed to be accepted at this moment.

Figure 7:
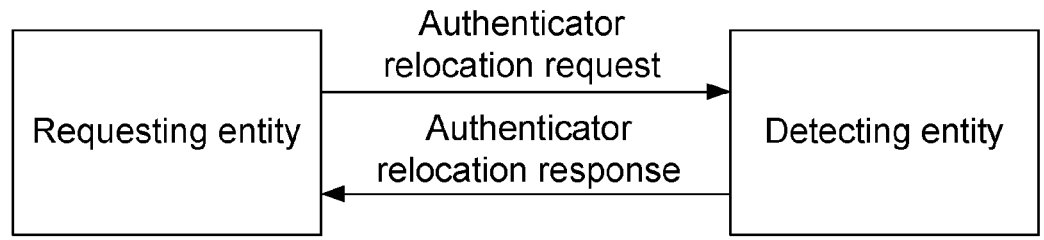
FIG. 7 is a diagram illustrating a composition schematic of a system for processing an authenticator relocation request in the disclosure.

According to the method of the disclosure, a system for processing an authenticator relocation request is further provided. As shown in FIG. 7, at least a requesting entity and a detecting entity at a network side are included, wherein the requesting entity is configured to initiate an authenticator relocation request from a terminal to the detecting entity; and the detecting entity is configured to receive the authenticator relocation request and refuse a new authenticator relocation request from the terminal when detecting that initial authentication, re-authentication or authenticator relocation is being performed for the terminal.

The detecting entity is further configured to, when detecting that the initial authentication, the re-authentication or the authenticator relocation is being performed for the terminal, refuse a new re-authentication request from the terminal.

The detecting entity is further configured to, when receiving the authenticator relocation request and detecting that no initial authentication, re-authentication or authenticator relocation of the terminal is being performed, confirm that the authenticator relocation request is accepted.

The detecting entity is further configured to, when the initial authentication, the re-authentication or the authenticator relocation of the terminal is completed, no matter the result of the initial authentication, the re-authentication or the authenticator relocation is successful or failed, confirm that no initial authentication, re-authentication or authenticator relocation is being performed for the terminal. Then the network side accepts a subsequent new authenticator relocation request or re-authentication request from the terminal.

When the detecting entity is an anchor authenticator, i.e. an old authenticator, a new authenticator relocation request may be from the terminal and forwarded by a serving BS, or from the serving BS itself, or from the old authenticator, or from a new authenticator. A new re-authentication request may be from the terminal and forwarded by a serving BS, or from the serving BS itself, or from the old authenticator, or from a new authenticator. At this moment, when detecting that the initial authentication, the re-authentication or the authenticator relocation is being performed for the terminal, the detecting entity will not initiate a new authenticator relocation request or re-authentication request initiatively.

When the detecting entity is an AAA server, the new authentication relocation request may be from the terminal and forwarded by an ASN, or from a serving BS itself, or from an old authenticator, or from a new authenticator. The new re-authentication request may be from the terminal and forwarded by an ASN, or from an old authenticator, or from a new authenticator.

Wherein the requesting entity may be a new authenticator, the detecting entity may be an old authenticator, and the system may further include an AAA server here; more specifically, the new authenticator is configured to initiate the authenticator relocation request from the terminal to the old authenticator, receive a response from the old authenticator; send an authenticator access verification request to the AAA server when the response received from the old authenticator is a success response; send an authenticator relocation completion request including refusal information to the old authenticator when receiving a refusal response from the AAA server; and send an authenticator relocation completion request including success information to the old authenticator when receiving a success response from the AAA server;

the old authenticator is configured to receive the authenticator relocation request from the terminal, and refuse an authenticator access request from the new authenticator when detecting that the initial authentication, the re-authentication or the authenticator relocation is being performed for the terminal; confirm that initial authentication, re-authentication or authenticator relocation is to be performed for the terminal when detecting that no initial authentication, re-authentication or authenticator relocation is being performed for the terminal; and when receiving the authenticator relocation completion request sent by the new authenticator, confirm that the authenticator relocation is completed no matter successful or not, and that no initial authentication, re-authentication or authenticator relocation is being performed for the terminal; and the AAA server is configured to receive the authenticator access verification request from the new authenticator, return the success response after verification is completed successfully, and return the refusal response when the verification is failed.

Or the requesting entity may be a new authenticator, the detecting entity may be an AAA server, and the system may further include an old authenticator here; and more specifically, the new authenticator is configured to initiate the authenticator relocation request from the terminal to the old authenticator, receive a response from the old authenticator, and send an authenticator access request to the AAA server; send an authenticator relocation completion request including refusal information to the old authenticator when receiving a refusal response from the AAA server; and send an authenticator relocation completion request including success information to the old authenticator when receiving a success response from the AAA server;

the old authenticator is configured to receive the authenticator relocation request, and return the response; receive the authenticator relocation completion request including refusal information, and return an authenticator relocation completion response and confirm a new authenticator relocation completion request from the terminal; and the AAA server is configured to receive the authenticator access request, refuse the authenticator access request from the new authenticator when detecting that the initial authentication, the re-authentication or the authenticator relocation is being performed for the terminal; or confirm that initial authentication, re-authentication or authenticator relocation is to be performed for the terminal when detecting that no initial authentication, re-authentication or authenticator relocation is being performed for the terminal; or approve the authenticator access request and confirm that the corresponding initial authentication, re-authentication or authenticator relocation has been completed for the terminal.

Or the requesting entity may be an old authenticator, the detecting entity may be an AAA server, and the system here may further include a new authenticator; and more specifically, the old authenticator is configured to send the new authenticator relocation request to the new authenticator and continues to serve as an authenticator of the terminal when a received authenticator relocation response includes refusal information;

the new authenticator is configured to receive the authenticator relocation request, send an authenticator access request to the AAA server; after receiving a refusal response from the AAA server, send the authenticator relocation response including refusal information to the old authenticator; receive a success response from the AAA server, and send an authenticator relocation completion request including success information to the old authenticator; and the AAA server is configured to receive the authenticator access request, refuse the authenticator access request from the new authenticator when detecting that the initial authentication, the re-authentication or the authenticator relocation is being performed for the terminal; or when detecting that no initial authentication, re-authentication or authenticator relocation is being performed for the terminal, confirm that initial authentication, re-authentication or authenticator relocation is to be performed for the terminal; or approve the authenticator access request and confirm that the corresponding initial authentication, re-authentication or authenticator relocation has been completed for the terminal.

The above are only preferred embodiments of the disclosure and not used to limit the protection scope of the disclosure. Any modifications, equivalent replacements, improvements or the like shall fall within the scope of protection of the disclosure.

The invention claimed is:

1. A method for processing an authenticator relocation request, comprising:
 refusing, by a network side, a new authenticator relocation request from a terminal, when the network side detects that initial authentication, re-authentication or authenticator relocation is being performed for the terminal.

2. The method according to claim 1, wherein the network side is an anchor authenticator; the new authenticator relocation request is from the terminal and forwarded by a serving Base Station (BS), or from the serving BS itself, or from a new authenticator.

3. The method according to claim 1, further comprising:
 confirming, by the network side, that no initial authentication, re-authentication or authenticator relocation is being performed for the terminal, when the initial authentication, the re-authentication or the authenticator relocation of the terminal is completed.

4. The method according to claim 1, wherein detecting, by the network side, whether or not the initial authentication, the re-authentication or the authenticator relocation is being performed comprises:
 setting an authenticator relocation state identifier for the terminal at the network side; when the authenticator relocation state identifier shows a locked state, indicating that the initial authentication, the re-authentication or the authenticator relocation is being performed for the terminal;
 or, setting a counter for the terminal at the network side; an initial value of the counter being 0; when the network side receives an initial authentication request, a re-authentication request, or an authenticator relocation request from the terminal, adding 1 to the initial value at the counter; when the initial authentication, the re-authentication or the authenticator relocation for the terminal is completed, adding 1 to the initial value at the counter; when a value of the counter is an odd number, indicating that the initial authentication, the re-authentication or the authenticator relocation is being performed for the terminal; when a value of the counter is an even number, indicating that no re-authentication or authenticator relocation is being performed;
 or, when the network side receives an initial authentication request, a re-authentication request, or an authenticator relocation request from the terminal, setting and starting a timer for the terminal at the network side; when the timer does not expire, indicating that the initial authentication, the re-authentication or the authenticator relocation is being performed for the terminal.

5. The method according to claim 4, wherein the network side comprises an anchor authenticator, an AAA server or a Mobility Management Entity (MME).

6. The method according to claim 1, further comprising:
 refusing, by the network side, a new re-authentication request from the terminal, when the network side detects that the initial authentication, the re-authentication or the authenticator relocation is being performed for the terminal.

7. The method according to claim 2, wherein the network side is an Authentication Authorization Accounting (AAA) server;
 the new authenticator relocation request is from the terminal and forwarded by an Access Service Network (ASN), or from a serving BS itself, or from an old authenticator, or from a new authenticator;
 the new re-authentication request is from the terminal and forwarded by an ASN, or from a serving BS itself, or from an old authenticator, or from a new authenticator.

8. The method according to claim 6, wherein detecting, by the network side, whether or not the initial authentication, the re-authentication or the authenticator relocation is being performed comprises:

setting an authenticator relocation state identifier for the terminal at the network side; when the authenticator relocation state identifier shows a locked state, indicating that the initial authentication, the re-authentication or the authenticator relocation is being performed for the terminal;

or, setting a counter for the terminal at the network side; an initial value of the counter being 0; when the network side receives an initial authentication request, a re-authentication request, or an authenticator relocation request from the terminal, adding 1 to the initial value at the counter; when the initial authentication, the re-authentication or the authenticator relocation for the terminal is completed, adding 1 to the initial value at the counter; when a value of the counter is an odd number, indicating that the initial authentication, the re-authentication or the authenticator relocation is being performed for the terminal; when a value of the counter is an even number, indicating that no re-authentication or authenticator relocation is being performed;

or, when the network side receives an initial authentication request, a re-authentication request, or an authenticator relocation request from the terminal, setting and starting a timer for the terminal at the network side; when the timer does not expire, indicating that the initial authentication, the re-authentication or the authenticator relocation is being performed for the terminal.

9. A system for processing an authenticator relocation request, at least comprising a requesting entity and a detecting entity at a network side, wherein the requesting entity is configured to initiate an authenticator relocation request from a terminal to the detecting entity; and the detecting entity is configured to receive the authenticator relocation request and refuse a new authenticator relocation request from the terminal when detecting that initial authentication, re-authentication or authenticator relocation is being performed for the terminal.

10. The system according to claim 9, wherein the detecting entity is further configured to, when the initial authentication, the re-authentication or the authenticator relocation of the terminal is completed, confirm that no initial authentication, re-authentication or authenticator relocation is being performed for the terminal.

11. The system according to claim 10, wherein the requesting entity is a new authenticator; the detecting entity is an old authenticator; the system further comprises an AAA server; wherein the new authenticator is configured to initiate the authenticator relocation request from the terminal to the old authenticator, receive a response from the old authenticator; send an authenticator access verification request to the AAA server when the response received from the old authenticator is a success response; send an authenticator relocation completion request including refusal information to the old authenticator when receiving a refusal response from the AAA server; and send an authenticator relocation completion request including success information to the old authenticator when receiving a success response from the AAA server;

the old authenticator is configured to receive the authenticator relocation request from the terminal, and refuse an authenticator access request from the new authenticator when detecting that the initial authentication, the re-authentication or the authenticator relocation is being performed for the terminal; confirm that initial authentication, re-authentication or authenticator relocation is to be performed for the terminal when detecting that no initial authentication, re-authentication or authenticator relocation is being performed for the terminal; and when receiving the authenticator relocation completion request from the new authenticator, confirm that the authenticator relocation is completed and that no initial authentication, re-authentication or authenticator relocation is being performed for the terminal; and the AAA server is configured to receive the authenticator access verification request from the new authenticator, return the success response after verification is completed successfully; and return the refusal response when the verification is failed.

12. The system according to claim 10, wherein the requesting entity is a new authenticator; the detecting entity is an AAA server; the system further comprises an old authenticator; wherein the new authenticator is configured to initiate the authenticator relocation request from the terminal to the old authenticator, receive a response from the old authenticator, and send an authenticator access request to the AAA server; send an authenticator relocation completion request including refusal information to the old authenticator when receiving a refusal response from the AAA server; and send an authenticator relocation completion request including success information to the old authenticator when receiving a success response from the AAA server;

the old authenticator is configured to receive the authenticator relocation request and return the response; and receive the authenticator relocation completion request including refusal information and return an authenticator relocation completion response; and the AAA server is configured to receive the authenticator access request, refuse the authenticator access request from the new authenticator when detecting that the initial authentication, the re-authentication or the authenticator relocation is being performed for the terminal; or confirm that initial authentication, re-authentication or authenticator relocation is to be performed for the terminal when detecting that no initial authentication, re-authentication or authenticator relocation is being performed for the terminal; or approve the authenticator access request and confirm that corresponding initial authentication, re-authentication or authenticator relocation has been completed for the terminal.

13. The system according to claim 10, wherein the requesting entity is an old authenticator; the detecting entity is an AAA server; the system further comprises a new authenticator; wherein the old authenticator is configured to send the new authenticator relocation request to the new authenticator and continues to serve as an authenticator of the terminal when a received authenticator relocation response includes refusal information;

the new authenticator is configured to receive the authenticator relocation request, send an authenticator access request to the AAA server; after receiving a refusal response from the AAA server, send the authenticator relocation response including refusal information to the old authenticator; and receive a success response from the AAA server, and send an authenticator relocation completion request including success information to the old authenticator; and the AAA server is configured to receive the authenticator access request, refuse the authenticator access request from the new authenticator when detecting that the initial authentication, the re-authentication or the authenticator relocation is being performed for the terminal; or when detecting that no initial authentication, re-authentication or authenticator relocation is being performed for the terminal, confirm that initial authentication, re-authentication or authenticator relocation is to be performed for the terminal; or approve the authenticator access request and confirm that corresponding initial authentication, re-authentication or authenticator relocation has been completed for the terminal.

14. The system according to claim 9, wherein the detecting entity is further configured to, when detecting that the initial authentication, the re-authentication or the authenticator relocation is being performed for the terminal, refuse a new re-authentication request from the terminal.

15. The system according to claim 14, wherein the detecting entity is an old authenticator; the new authenticator relocation request is from the terminal and forwarded by a serving Base Station (BS), or from the serving BS itself, or from the old authenticator, or from a new authenticator;
the new re-authentication request is from the terminal and forwarded by a serving BS, or from the serving BS itself, or from the old authenticator, or from a new authenticator.

16. The system according to claim 14, wherein the detecting entity is an Authentication Authorization Accounting (AAA) server; the new authenticator relocation request is from the terminal and forwarded by an Access Service Network (ASN), or from a serving BS itself, or from an old authenticator, or from a new authenticator;
the new re-authentication request is from the terminal and forwarded by a serving BS, or from the serving BS itself, or from an old authenticator, or from a new authenticator.

17. The method according to claim 8, wherein the network side comprises an anchor authenticator, an AAA server or a Mobility Management Entity (MME).

18. The system according to claim 14, wherein the requesting entity is a new authenticator; the detecting entity is an old authenticator; the system further comprises an AAA server; wherein
the new authenticator is configured to initiate the authenticator relocation request from the terminal to the old authenticator, receive a response from the old authenticator; send an authenticator access verification request to the AAA server when the response received from the old authenticator is a success response; send an authenticator relocation completion request including refusal information to the old authenticator when receiving a refusal response from the AAA server; and send an authenticator relocation completion request including success information to the old authenticator when receiving a success response from the AAA server;
the old authenticator is configured to receive the authenticator relocation request from the terminal, and refuse an authenticator access request from the new authenticator when detecting that the initial authentication, the re-authentication or the authenticator relocation is being performed for the terminal; confirm that initial authentication, re-authentication or authenticator relocation is to be performed for the terminal when detecting that no initial authentication, re-authentication or authenticator relocation is being performed for the terminal; and when receiving the authenticator relocation completion request from the new authenticator, confirm that the authenticator relocation is completed and that no initial authentication, re-authentication or authenticator relocation is being performed for the terminal; and
the AAA server is configured to receive the authenticator access verification request from the new authenticator, return the success response after verification is completed successfully; and return the refusal response when the verification is failed.

19. The system according to claim 14, wherein the requesting entity is a new authenticator; the detecting entity is an AAA server; the system further comprises an old authenticator; wherein
the new authenticator is configured to initiate the authenticator relocation request from the terminal to the old authenticator, receive a response from the old authenticator, and send an authenticator access request to the AAA server; send an authenticator relocation completion request including refusal information to the old authenticator when receiving a refusal response from the AAA server; and send an authenticator relocation completion request including success information to the old authenticator when receiving a success response from the AAA server;
the old authenticator is configured to receive the authenticator relocation request and return the response; and receive the authenticator relocation completion request including refusal information and return an authenticator relocation completion response; and
the AAA server is configured to receive the authenticator access request, refuse the authenticator access request from the new authenticator when detecting that the initial authentication, the re-authentication or the authenticator relocation is being performed for the terminal; or confirm that initial authentication, re-authentication or authenticator relocation is to be performed for the terminal when detecting that no initial authentication, re-authentication or authenticator relocation is being performed for the terminal; or approve the authenticator access request and confirm that corresponding initial authentication, re-authentication or authenticator relocation has been completed for the terminal.

20. The system according to claim 14, wherein the requesting entity is an old authenticator; the detecting entity is an AAA server; the system further comprises a new authenticator; wherein
the old authenticator is configured to send the new authenticator relocation request to the new authenticator and continues to serve as an authenticator of the terminal when a received authenticator relocation response includes refusal information;
the new authenticator is configured to receive the authenticator relocation request, send an authenticator access request to the AAA server; after receiving a refusal response from the AAA server, send the authenticator relocation response including refusal information to the old authenticator; and receive a success response from the AAA server, and send an authenticator relocation completion request including success information to the old authenticator; and
the AAA server is configured to receive the authenticator access request, refuse the authenticator access request from the new authenticator when detecting that the initial authentication, the re-authentication or the authenticator relocation is being performed for the terminal; or when detecting that no initial authentication, re-authentication or authenticator relocation is being performed for the terminal, confirm that initial authentication, re-authentication or authenticator relocation is to be performed for the terminal; or approve the authenticator access request and confirm that corresponding initial authentication, re-authentication or authenticator relocation has been completed for the terminal.

* * * * *